(12) United States Patent
Chun et al.

(10) Patent No.: US 8,194,559 B2
(45) Date of Patent: Jun. 5, 2012

(54) METHOD OF CONTROLLING DATA RETRANSMISSION IN A WIRELESS COMMUNICATION SYSTEM

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 279 days.

(21) Appl. No.: 12/448,813

(22) PCT Filed: Jan. 9, 2008

(86) PCT No.: PCT/KR2008/000137
§ 371 (c)(1),
(2), (4) Date: Jul. 8, 2009

(87) PCT Pub. No.: WO2008/084984
PCT Pub. Date: Jul. 17, 2008

(65) Prior Publication Data
US 2010/0097987 A1    Apr. 22, 2010

Related U.S. Application Data

(60) Provisional application No. 60/884,198, filed on Jan. 9, 2007.

(30) Foreign Application Priority Data

Jan. 9, 2008   (KR) ................. 10-2008-0002549

(51) Int. Cl.
*G01R 31/08* (2006.01)
(52) U.S. Cl. .................... 370/252; 370/394; 714/748

(58) Field of Classification Search .......... 370/328–338, 370/349–350, 428–429, 252–253, 394–427; 714/748
See application file for complete search history.

(56) References Cited

U.S. PATENT DOCUMENTS

| 6,470,391 B2 | 10/2002 | Takamoto et al. |
| 6,665,313 B1 | 12/2003 | Chang et al. |
| 6,697,347 B2 | 2/2004 | Ostman et al. |

(Continued)

FOREIGN PATENT DOCUMENTS
CN        1595362        3/2005
(Continued)

OTHER PUBLICATIONS

"Universal Mobile Telecommunications System (UMTS); User Equipment (UE) procedures in idle mode and procedures for cell reselection in connected mode (3GPP TS 25.304 version 7.1.0 Release 7); ETSI TS 125 304", ETSI Standards, Dec. 2006, XP014039981.

(Continued)

*Primary Examiner* — Pao Sinkantarakorn
*Assistant Examiner* — Iqbal Zaidi
(74) *Attorney, Agent, or Firm* — McKenna Long & Aldridge LLP

(57) ABSTRACT

A method for controlling data retransmission at a transmitting side in a wireless communication system is provided. In the method, the transmitting side transmits a new transmission packet to a receiving side. The transmitting side then transmits reason indication information, indicating a reason why the transmitting side has initiated the transmission of the new transmission packet, to the receiving side.

9 Claims, 7 Drawing Sheets

U.S. PATENT DOCUMENTS

| | | | |
|---|---|---|---|
| 6,778,501 B1 | 8/2004 | Malmgren et al. | |
| 7,006,464 B1 | 2/2006 | Gopalakrishnan et al. | |
| 7,158,504 B2 | 1/2007 | Kadaba et al. | |
| 7,295,573 B2 | 11/2007 | Yi et al. | |
| 7,359,924 B2 | 4/2008 | Balachandran et al. | |
| 7,542,457 B2 | 6/2009 | Wu | |
| 7,646,742 B2 | 1/2010 | Petrovic et al. | |
| 7,764,661 B2 | 7/2010 | Heo et al. | |
| 7,801,563 B2 | 9/2010 | Hara et al. | |
| 7,912,471 B2 | 3/2011 | Kodikara Patabandi et al. | |
| 2002/0170013 A1 | 11/2002 | Bolourchi et al. | |
| 2002/0174276 A1 | 11/2002 | Jiang | |
| 2003/0040314 A1 | 2/2003 | Hogan et al. | |
| 2003/0095519 A1 | 5/2003 | Kuo et al. | |
| 2003/0152083 A1 | 8/2003 | Nagata et al. | |
| 2003/0157953 A1 | 8/2003 | Das et al. | |
| 2003/0181221 A1 | 9/2003 | Nguyen | |
| 2003/0210669 A1 | 11/2003 | Vayanos et al. | |
| 2003/0214935 A1* | 11/2003 | Khan et al. | 370/349 |
| 2003/0231612 A1 | 12/2003 | Kim et al. | |
| 2004/0103435 A1 | 5/2004 | Yi et al. | |
| 2004/0228294 A1 | 11/2004 | Kim et al. | |
| 2004/0266461 A1 | 12/2004 | Beckmann et al. | |
| 2005/0039101 A1 | 2/2005 | Torsner | |
| 2005/0083943 A1 | 4/2005 | Lee et al. | |
| 2005/0111487 A1 | 5/2005 | Matta et al. | |
| 2005/0207343 A1 | 9/2005 | Han | |
| 2005/0220116 A1 | 10/2005 | Ahn et al. | |
| 2005/0237960 A1 | 10/2005 | Kim | |
| 2006/0018294 A1 | 1/2006 | Kynaslahti et al. | |
| 2006/0067238 A1 | 3/2006 | Olsson et al. | |
| 2006/0092911 A1 | 5/2006 | Hwang et al. | |
| 2006/0092973 A1 | 5/2006 | Petrovic et al. | |
| 2006/0114877 A1 | 6/2006 | Heo et al. | |
| 2006/0140158 A1 | 6/2006 | Terry | |
| 2006/0148411 A1 | 7/2006 | Cho et al. | |
| 2006/0203760 A1* | 9/2006 | Fukui et al. | 370/328 |
| 2006/0245386 A1 | 11/2006 | Hu | |
| 2006/0251019 A1 | 11/2006 | Dalsgaard et al. | |
| 2006/0251105 A1 | 11/2006 | Kim et al. | |
| 2007/0047452 A1 | 3/2007 | Lohr et al. | |
| 2007/0064602 A1 | 3/2007 | Jiang | |
| 2007/0091810 A1 | 4/2007 | Kim et al. | |
| 2007/0254679 A1 | 11/2007 | Montojo et al. | |
| 2007/0293222 A1 | 12/2007 | Vikberg et al. | |
| 2008/0045272 A1 | 2/2008 | Wang et al. | |
| 2008/0056148 A1 | 3/2008 | Wu | |
| 2008/0056183 A1 | 3/2008 | Gorokhov et al. | |
| 2008/0084844 A1 | 4/2008 | Reznik et al. | |
| 2008/0101270 A1 | 5/2008 | Kekki et al. | |
| 2008/0101280 A1* | 5/2008 | Gholmieh et al. | 370/328 |
| 2008/0117891 A1 | 5/2008 | Damnjanovic et al. | |
| 2008/0165724 A1 | 7/2008 | Wu et al. | |
| 2008/0273610 A1 | 11/2008 | Malladi et al. | |
| 2009/0028123 A1 | 1/2009 | Terry et al. | |
| 2009/0221293 A1 | 9/2009 | Petrovic et al. | |
| 2009/0268676 A1 | 10/2009 | Wigard et al. | |
| 2010/0091721 A1 | 4/2010 | Larmo et al. | |
| 2011/0190001 A1 | 8/2011 | Kodikara Patabandi et al. | |

FOREIGN PATENT DOCUMENTS

| | | |
|---|---|---|
| CN | 1805596 | 7/2006 |
| EP | 1 432 261 | 6/2004 |
| EP | 1 724 948 | 11/2006 |
| EP | 1 755 355 | 2/2007 |
| EP | 1 843 504 | 10/2007 |
| EP | 1 845 649 | 10/2007 |
| EP | 1 845 650 | 10/2007 |
| JP | 2002-247042 | 8/2002 |
| JP | 2002-527945 | 8/2002 |
| JP | 2002-290413 | 10/2002 |
| JP | 2003-304574 | 10/2003 |
| JP | 2005-525065 | 8/2005 |
| JP | 2006-121394 | 5/2006 |
| JP | 2006-148490 | 6/2006 |
| JP | 2006-237897 | 9/2006 |
| JP | 2006-524444 | 10/2006 |
| JP | 2006-524969 | 11/2006 |
| JP | 2006-352708 | 12/2006 |
| JP | 2009-535957 | 10/2009 |
| RU | 2004-132193 | 4/2005 |
| RU | 2005-116242 A | 11/2005 |
| RU | 2004-126160 | 1/2006 |
| WO | WO 97/11566 | 3/1997 |
| WO | WO 98/24250 | 6/1998 |
| WO | WO 2002/093296 | 11/2002 |
| WO | WO 03/084095 A1 | 10/2003 |
| WO | WO 2003/085874 | 10/2003 |
| WO | WO 03/096149 | 11/2003 |
| WO | WO 2003/096567 | 11/2003 |
| WO | WO 2004/017541 A1 | 2/2004 |
| WO | WO 2004/042952 | 5/2004 |
| WO | WO 2005/119941 | 12/2005 |
| WO | WO 2005/125252 | 12/2005 |
| WO | WO 2006/022876 | 3/2006 |
| WO | WO 2006/105333 | 10/2006 |
| WO | WO 2006/118418 | 11/2006 |
| WO | WO 2007/068304 | 6/2007 |

OTHER PUBLICATIONS

"Universal Mobile Telecommunications System (UMTS); High Speed Downlink Packet Access (HSDPA); Overall description; Stage 2 (3GPP TS 25.308 version 7.1.0 Release 7); ETSI TS 125 308", ETSI Standards, LIS, Dec. 2006, XP014039997.

Samsung: "DL Control Channel Structure: Overview", 3GPP TSG-RAN WG1, R1-062534, Oct. 9, 2006, sections 1-4.

Ericsson: "E_UTRA Downlink Control Signaling—Open Issues", 3GPP TSG-RAN WG1, R!061365, May 8, 2006, section 2.

Rapporteur (Motorola): "Report of E-Mail Discussion: DL Scheduling", 3GPP TSG-RAN WG1, R1-063684, Dec. 12, 2006, section 2, annex C.

LG Electronic: "Downlink control signaling", 3GPP TSG_RAN WG1, R1-063177, Nov. 6, 2006, sections 1-2.

Texas Instruments: "Control Channel Structure and Coding in E-UTRA Downlink", 3GPP TSG-RAN WG1, R1-063220, Nov. 6, 2006, sections 1-5.

Sharp: "UE Identity in L1/L2 Control Signaling for Downlink Scheduling Resource Allocation", 3GPP TSG-RAN WG2, R2-061129, May 8, 2006, sections 1-3.

Nokia: "ARQ Operation with HARQ-ARQ Interaction", 3GPP TSG-RAN WG2, R2-062765, Oct. 9, 2006, sections 2-3.

Ericsson: "Uplink HARQ-ARQ Interactions for NACK -> ACK Error", 3GP TSG-RAN WG2, R2-063238, Nov. 6, 2006, fig. 1, p. 2.

Samsung:" MAC functions: ARQ", 3GP TSG-RAN WG2, R2-060374, Feb. 13, 2006, section 2.

Herrmann, C. et al., "Improving Packet Loss Probability in the UMTS High-Speed Downlink", IEEE Vehicular Technology Conference, VTC Fall 2003, Oct. 6, 2003, pp. 2655-2659.

3$^{rd}$ Generation Partnership Project: Technical Specification Group Radio Access Network, Physical Layers Aspects for Evolved UTRA (Release 7), 3GPP TR 25.814, v1.5.0, May 2006.

* cited by examiner

METHOD OF CONTROLLING DATA RETRANSMISSION IN A WIRELESS COMMUNICATION SYSTEM

This application is a national phase entry of International Application No. PCT/KR2008/000137, filed Jan. 9, 2008 and claims priority to Korean Patent Application No. 10-2007-0002549 filed Jan. 9, 2008 and U.S. Provisional Application No. 60/884,198 filed Jan. 9, 2007, all of which are hereby incorporated by reference in their entireties.

TECHNICAL FIELD

The present invention relates to a wireless communication system, and more particularly, to a method of controlling data retransmission in a wireless communication system.

BACKGROUND ART

An Auto Repeat reQuest (ARQ) or Hybrid Auto Repeat reQuest (HARQ) technique is frequently used to improve throughput to perform smooth communication in wireless communication systems.

The ARQ or HARQ technique allows the receiving side to feed presence or absence of received data back to the transmitting side, thereby allowing the transmitting side to retransmit the data when the received data contains an error. In the ARQ or HARQ technique, the receiving side transmits an acknowledgement signal (ACK) to the transmitting side when it has received data transmitted from the transmitting side without error. On the other hand, the receiving side transmits a negative acknowledgement signal (NACK) to the transmitting side when the received data contains an error, thereby allowing the transmitting side to retransmit the data so that the receiving side accurately receives the data.

FIG. 1 illustrates a Hybrid ARQ (HARQ) method in a conventional WCDMA system. In FIG. 1, a base station determines a terminal (or user equipment) which is to receive a packet and the formats (such as coding rate, modulation method, and data amount) of the packet to be transmitted to the terminal. The base station first provides information regarding the determination to the terminal through a downlink control channel (HS-SCCH) and then transmits an HS-DSCH data packet at its associated time. The terminal receives the downlink control channel and reads the formats of the packet to be transmitted to the terminal and the time at which the data is to be transmitted. The terminal can receive the packet using the read information.

After receiving the packet, the terminal decodes the received packet. If the received packet is successfully decoded, the terminal transmits an ACK signal to the base station. Upon receiving the ACK signal, the base station determines that the packet has been successfully transmitted to the terminal and thus can perform a next packet transmission process. If decoding of the received packet fails, the terminal transmits a NACK signal to the base station. Upon receiving the NACK signal, the base station determines that the packet has failed to be transmitted to the terminal and then constructs and retransmits the same data in the same packet format or a new packet format at an appropriate time. Upon receiving the retransmitted data, the terminal attempts to decode the data by combining it with the previously received packet, which it failed to decode, using a variety of methods.

In the HARQ or ARQ technique, the transmitting side performs packet retransmission based on the ACK/NACK feedback from the receiving side as described above. That is, the transmitting side performs packet retransmission if it has received a NACK from the receiving side. On the other hand, the transmitting side does not perform packet retransmission if it has received an ACK from the receiving side. Here, if a buffer in the transmitting side contains remaining data to be sent to the receiving side and an HARQ scheduler has allocated radio resources for transmitting the data, the transmitting side starts transmitting a new packet. In the following description, the term "retransmission packet" refers to a packet which the transmitting side retransmits after receiving a NACK from the receiving side and the term "new transmission packet" refers to the first packet which the transmitting side transmits to the receiving side when starting new packet transmission, which occurs when the transmitting side initiates data transmission to the receiving side or when an ACK is received from the receiving side during data transmission. That is, new transmission packets are packets which are not retransmission packets.

In the ARQ or HARQ technique, it is very important that the receiving side accurately feed ACKs/NACKs back to the transmitting side. However, it is likely that an error will occur during transmission of ACK/NACK data, unlike transmission of other upper channel data, because the ACK/NACK data consists of 1 or 2 bits and also because it is not easy to apply any additional protection device. For example, an HARQ entity of the transmitting side may receive a NACK although an HARQ entity of the receiving side has transmitted an ACK or the HARQ entity of the transmitting side may receive an ACK although the HARQ entity of the receiving side has transmitted a NACK. Errors occurring during ACK/NACK transmission may cause a reduction in system performance. For example, if the transmitting side receives an ACK although the receiving side has transmitted a NACK, then the transmitting side will start transmitting a new packet. In this case, the receiving side cannot accurately reconstruct data since it receives a new transmission packet while awaiting receipt of a retransmission packet. In this case, data transmission delays may also occur since the upper layer of the receiving side will not request transmission of upper layer data from the upper layer of the transmitting side.

DISCLOSURE OF THE INVENTION

An object of the present invention devised to solve the above problems lies in providing a method for increasing the efficiency of data transmission and reducing data transmission delay in a wireless communication system.

In one aspect of the present invention, the object can be achieved by providing a method for controlling data retransmission at a transmitting side in a wireless communication system, the method comprising transmitting a new transmission packet to a receiving side, the new transmission packet not being a retransmission packet to be transmitted to the receiving side in response to a negative acknowledgement signal (NACK) transmitted from the receiving side, and transmitting reason indication information, indicating a reason why the transmitting side has initiated the transmission of the new transmission packet, to the receiving side.

In another aspect of the present invention, the object can also be achieved by providing a method for controlling data retransmission at a receiving side in a wireless communication system, the method comprising receiving a new transmission from a transmitting side, the new transmission packet not being a retransmission packet to be transmitted by the transmitting side in response to a negative acknowledgement signal (NACK) transmitted to the transmitting side, and receiving reason indication information, indicating a reason why the transmitting side has initiated the transmission of the new transmission packet, from the transmitting side.

According to the embodiments of the invention, it is possible to increase the efficiency of data transmission and to reduce transmission delay in a data retransmission process in a wireless communication system.

BEST MODE FOR CARRYING OUT THE INVENTION

The above and other configurations, operations, and features of the present invention will be easily understood from the embodiments of the invention described below with reference to the accompanying drawings. The embodiments described below are examples wherein technical features of the invention are applied to an Evolved Universal Mobile Telecommunications System (E-UMTS).

Figure 1:
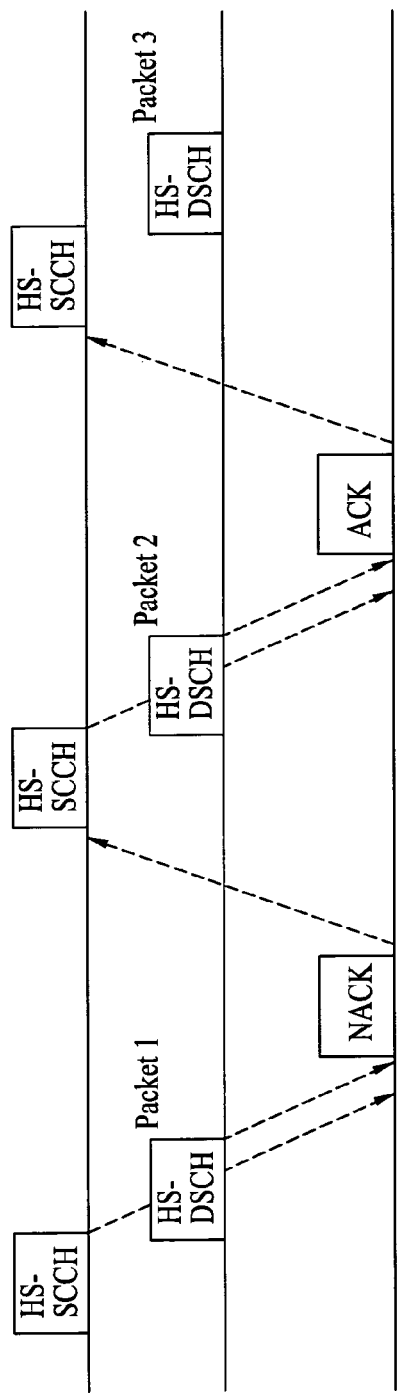
FIG. 1 illustrates a hybrid ARQ (HARQ) method in a conventional WCDMA system.
Figure 2:
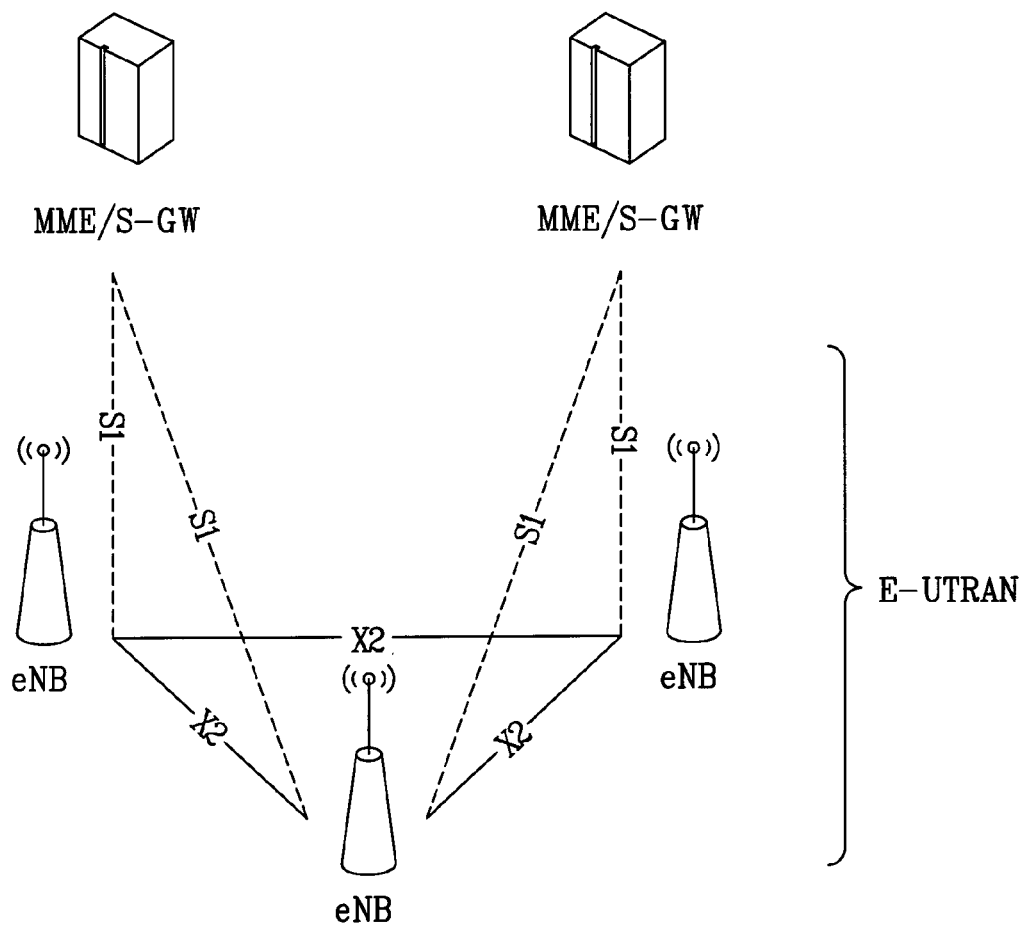
FIG. 2 shows a network structure of an E-UMTS.

FIG. 2 shows a network structure of the E-UMTS. The E-UMTS system is an evolved version of the conventional WCDMA UMTS and basic standardization thereof is in progress under the 3rd Generation Partnership Project (3GPP). The E-UMTS is also referred to as a Long Term Evolution (LTE) system. See "http://www.3gpp.org/ftp/Specs/2006-12/" and "http://www.3gpp.org/ftp/Specs/html-info/GanttChart-Level-2.htm" for details of the technical specifications of the UMTS and E-UMTS.

As shown in FIG. 2, an E-UTRAN includes base stations which will be referred to as "eNode B" or "eNB" for short. The eNBs are connected through X2 interfaces. Each eNB is connected to User Equipments (UEs) (or terminals) through a radio interface and is connected to an Evolved Packet Core (EPC) through an S1 interface. The EPC includes a Mobility Management Entity (MME)/System Architecture Evolution (SAE) gateway.

Radio interface protocol layers between UEs and the network can be divided into an L1 layer (first layer), an L2 layer (second layer), and an L3 layer (third layer) based on the lower three layer is of the Open System Interconnection (OSI) reference model widely known in communication systems. A physical layer included in the first layer among these layers provides an information transfer service using a physical channel and a Radio Resource Control (RRC) layer located in the third layer controls radio resources between UEs and the network. To accomplish this, the RRC layer exchanges RRC messages between UEs and the network. The RRC layer may be provided in a distributed manner over network nodes such as Node Bs and AGs and may also be individually provided in a Node B or an AG.

Figure 3:
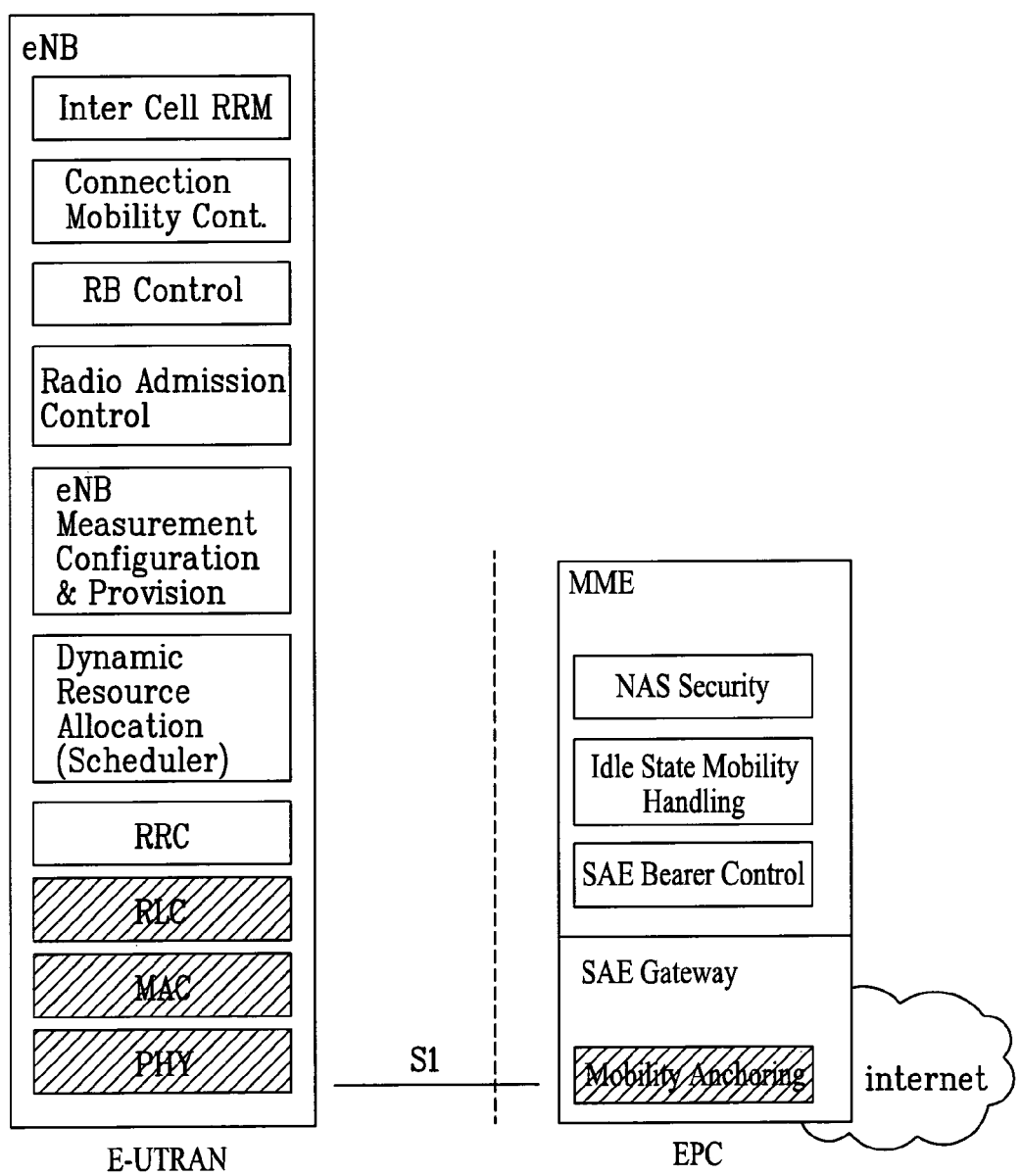
FIG. 3 schematically illustrates an Evolved Universal Terrestrial Radio Access Network (E-UTRAN)

FIG. 3 schematically illustrates an Evolved Universal Terrestrial Radio Access Network (E-UTRAN). In FIG. 3, hatched portions denote functional entities of the user plane and unhatched portions denote functional entities of the control plane.

Figure 4A:
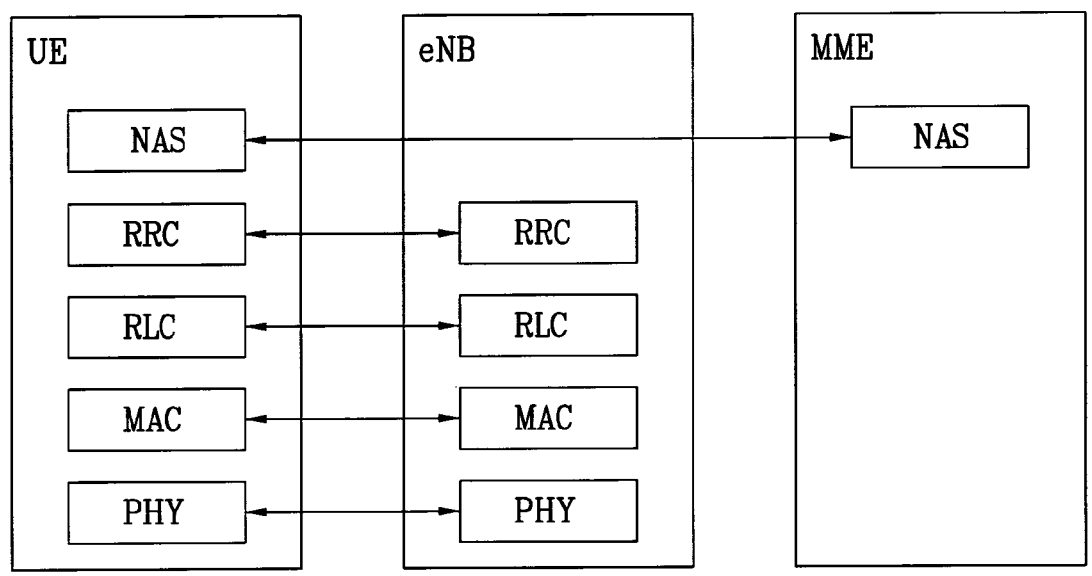
FIGS. 4A and 4B illustrate control-plane and user-plane radio interface protocol structures between a UE and an E-UTRAN, respectively.
Figure 4B:
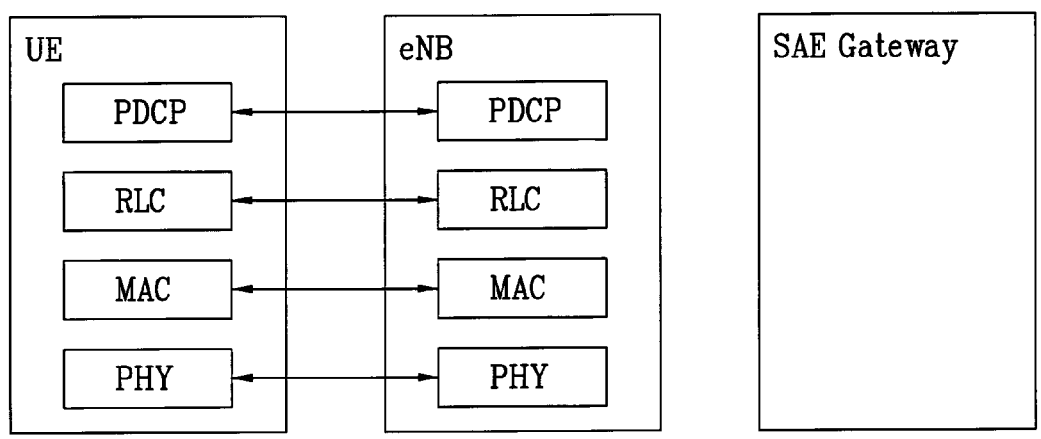

FIGS. 4A and 4B illustrate control-plane and user-plane radio interface protocol structures between a UE and an E-UTRAN, respectively. The radio interface protocol of FIGS. 4A and 4B is divided horizontally into a physical layer, a data link layer, and a network layer and vertically into a user plane for data information transmission and a control plane for signaling. The protocol layers of FIGS. 4A and 4B can be divided into an L1 layer (first layer), an L2 layer (second layer), and an L3 layer (third layer) based on the lower three layers of the Open System Interconnection (OSI) reference model widely known in communication systems.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. In the E-UMTS, the physical channel is modulated according to the Orthogonal Frequency Division Multiplexing (OFDM) method, using time and frequencies as radio resources.

The MAC layer, which is the second layer, provides a service to a Radio Link Control (RLC) layer, located above the MAC layer, through a logical channel. The RLC layer of the second layer supports reliable data transfer. A PDCP layer of the second layer performs a header compression function to reduce unnecessary control information in order to efficiently transmit data through IP packets such as IPv4 or IPv6 packets in a radio interval with a relatively small bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the UTRAN.

Downlink transport channels used to transmit data from the network to the UE include a Broadcast Channel (BCH) used to transmit system information, a Paging Channel (PCH) used to transmit paging messages, and a downlink Shared Channel (SCH) used to transmit user traffic or control messages. Control messages or traffic of a downlink multicast or broadcast service may be transmitted through a downlink SCH and may also be transmitted through a downlink multicast channel (MCH). Uplink transport channels used to transmit data from the UE to the network include a Random Access Channel (RACH) used to transmit initial control messages and an uplink SCH used to transmit user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

In the E-UMTS system, Orthogonal Frequency Division Multiplexing (OFDM) is used in downlink and Single Carrier-Frequency Division Multiple Access (SC-FDMA) is used in uplink. The OFDM system, which is based on a multicarrier scheme, allocates resources in units of groups of subcarriers, which are part of a carrier, and uses Orthogonal Frequency Division Multiple Access (OFDMA) as an access method.

In a wireless communication system which uses a multi-carrier scheme such as OFDM or Single Carrier-Frequency Division Multiple Access (SC-FDMA), radio resources are defined by a time-frequency region in a two-dimensional space, which is a set of consecutive subcarriers. One time-frequency region is defined by a rectangle determined by time and subcarrier coordinates. That is, one time-frequency region can be defined by at least one symbol in the time domain and multiple subcarriers in the frequency domain. Such a time-frequency region can be allocated to an uplink of a specific UE or the BS can transmit a time-frequency region to a specific UE in downlink. The number of OFDM symbols in the time domain and the number of subcarriers, starting from a position located at an offset from a reference point in the frequency domain, should be given in order to define a time-frequency region in the two-dimensional space.

The E-UMTS system, which is currently under discussion, uses 10 ms radio frames, each including 20 subframes. That is, each subframe is 0.5 ms long. Each resource block includes one subframe and 12 subcarriers, each of which occupies a 15 kHz band. One subframe includes multiple OFDM symbols. Some (for example, the first symbol) of the OFDM symbols can be used to transmit L1/L2 control information.

Figure 5:
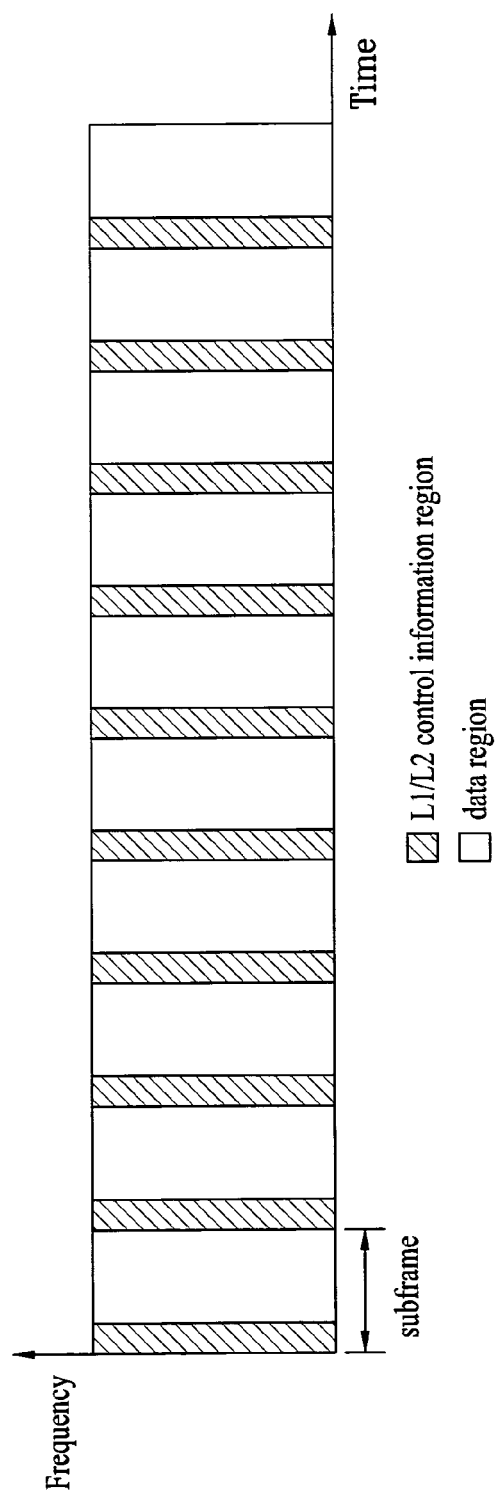
FIG. 5 illustrates an example structure of a physical channel used in the E-UMTS system.

FIG. 5 illustrates an example structure of a physical channel used in the E-UMTS system, wherein each subframe includes an L1/L2 control information transport region (hatched in the figure) and a data transport region (not hatched in the figure).

Reference will now be made to an example of an HARQ technique that can be applied to the E-UMTS.

To transmit data to a UE according to the HARQ technique, the BS transmits downlink (DL) scheduling information through a DL L1/L2 control channel.

The DL scheduling information may include a UE identifier (UE ID) or a UE group identifier (Group ID), location and duration information of radio resources allocated for downlink data transmission, transmission parameters such as MIMO-related information, payload size, and modulation method, HARQ process information, a redundancy version, and a new data indicator to identify new data.

Basically, the DL scheduling information can be transmitted through a DL L1/L2 control channel even when retransmission is performed and can be changed according to the channel state. For example, the modulation method or payload size can be changed to transmit data at a higher bit rate if the channel state is better than in initial transmission, while it can be changed to transmit data at a lower bit rate if the channel state is worse.

The UE monitors a DL L1/L2 control channel every TTI to check DL scheduling information destined for the UE and then receives a new transmission or retransmission packet from the BS using the DL scheduling information. However, it is difficult to transmit DL scheduling information for multiple UEs during one TTI since the amount of information transmittable through the DL L1/L2 control channel is limited. One method to overcome this problem is to transmit DL scheduling information through the DL L1/L2 control channel only during initial transmission of data and thereafter to perform retransmission using the same DL scheduling information as that of the initial transmission. That is, when the UE detects that DL scheduling information destined for the UE is received through the DL L1/L2 control channel while monitoring the DL L1/L2 control channel, the UE receives data according to the DL scheduling information.

If the UE has failed to normally receive the data, the UE transmits a NACK to the BS to request retransmission. Upon receiving the request, the BS retransmits data without DL scheduling information to the UE. That is, if the UE receives data and transmits a NACK, then the UE can receive data using DL scheduling information at the initial transmission even if no DL scheduling information is received through the DL A1/2 control channel in a predetermined time.

Figure 6:
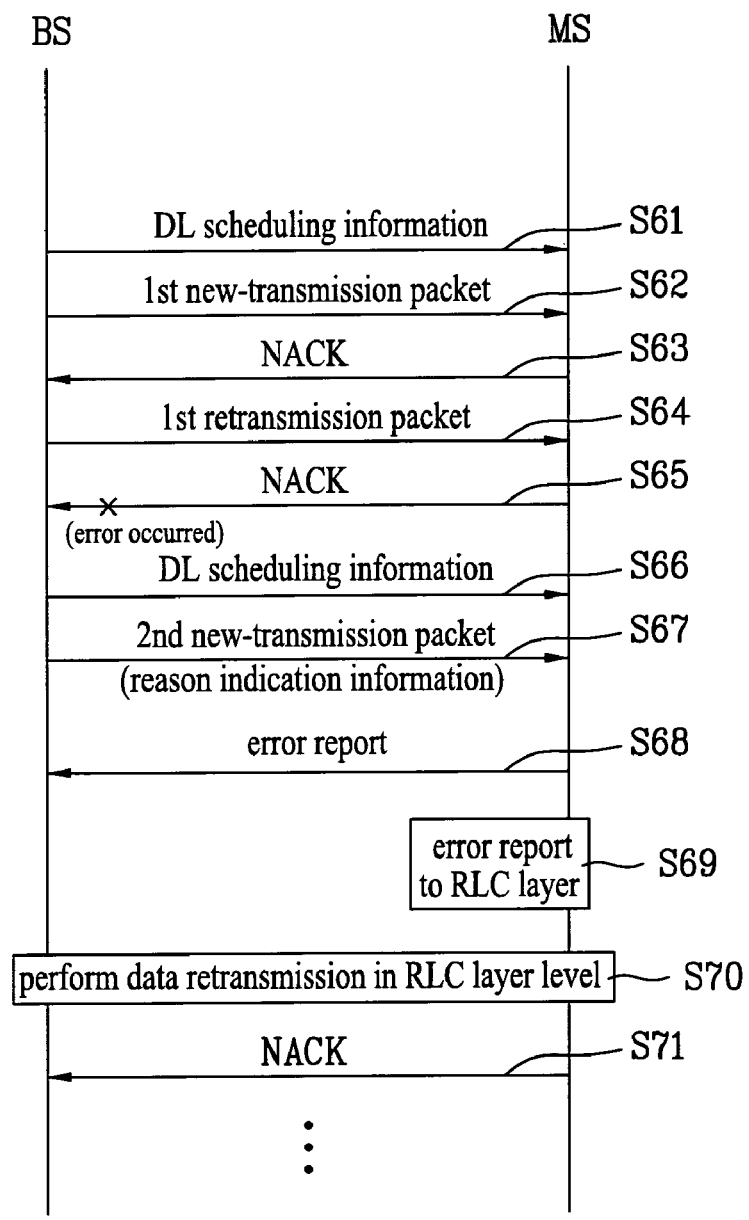
FIG. 6 is a flow chart illustrating a preferred embodiment of the invention.

FIG. 6 is a flow chart illustrating an embodiment of the invention. The embodiment of FIG. 6 is an example wherein the technical features of the invention are applied to a data retransmission method based on the HARQ technique. The HARQ technique in the UMTS or E-UMTS system is implemented through control of MAC layers of the network and a UE (or MS). When the HARQ technique is applied, data retransmission is not indefinitely continued until the receiving side successively receives corresponding packets but is performed until the number of transmissions of the data reaches a maximum allowed count. For example, when the maximum allowed count is 3, the BS can transmit a retransmission packet twice after transmitting a new transmission packet. On the other hand, the method of the embodiment of FIG. 6 can be applied to methods of data transmission in uplink although the embodiment of FIG. 6 is an example of the method of data retransmission in downlink.

As shown in FIG. 6, the BS transmits DL scheduling information to a UE through an L1/L2 control channel (S61) and then transmits a first new transmission packet (S62). Details of the DL scheduling information are the same as described above. The first retransmission packet is a MAC Protocol Data Unit (PDU) since HARQ is performed between MAC layers of the BS and the UE as described above.

The UE receives the first new transmission packet using the received DL scheduling information. The UE decodes the received first new transmission packet. The UE transmits an ACK to the BS if the decoding is successful and transmits a NACK to the BS if the decoding is unsuccessful. In the example of FIG. 6, the UE transmits a NACK since the UE has failed to decode the first new transmission packet (S63).

The BS receives a NACK in response to the first new transmission packet and thus transmits a first retransmission packet to the UE (S64). Here, the BS may or may not transmit DL scheduling information for transmission of the first retransmission packet according to the system design as described above.

After receiving the first retransmission packet, the UE decodes the packet by combining it with the first new transmission packet. The UE transmits a NACK to the BS if decoding of the packet fails (S65). Here, let us assume that the BS has received an ACK since an error has occurred during the NACK transmission process.

The BS initiates the transmission of a new packet since it has received an ACK. That is, the BS transmits DL scheduling information to the UE (S66) and then transmits a second new transmission packet to the UE (S67). Here, the BS transmits information indicating the reason why it has initiated the transmission of the new packet (i.e., information notifying the UE of the reason why the BS has transmitted the second new transmission packet) to the UE. In FIG. 6, the reason indication information indicates that the reason is that the BS has received an ACK in response to the first retransmission packet.

Examples of the reason why the transmitting side initiates the transmission of a new packet when the HARQ technique is applied include the following in addition to the reception of an ACK from the receiving side. First, the transmitting side can start transmitting a new packet when the number of transmissions has reached the maximum allowed count although the transmitting side has received a NACK from the receiving side. Second, the transmitting side can start transmitting a new packet for a second service when there is a need to transmit data for the second service with higher priority than a first service to the receiving side while the transmitting side transmits data for the first service to the receiving side according to the HARQ technique. Thus, the reason indication information may include information indicating these reasons.

In FIG. 6, the BS can transmit the reason indication information to the UE using a variety of methods. The first method is to incorporate the reason indication information into the second new transmission packet to be transmitted. Since the second new transmission packet is a MAC PDU created in the MAC layer of the BS, the reason indication information can be incorporated into a header or a specific control element of the MAC PDU while the MAC PDU is created. Here, an indicator that the reason indication information is included in the MAC PDU can be included in the header of the MAC PDU. The indicator can be included in the MAC PDU by setting the value of an RLC ID or a logical channel ID to a specific value. The reason indication information may include not only the reason why the BS has started transmitting a new packet but also information associated with HARQ processes for controlling data retransmission based on the HARQ technique. The information associated with HARQ processes may include information indicating the reason why another HARQ process has started transmitting a new packet.

The second method is that the BS transmits the reason indication information to the UE at a physical layer level. That is, the BS can transmit the reason indication information to the UE through an L1/L2 control channel, for example a Physical Downlink Control Channel (PDCCH). In FIG. 6, since the DL scheduling information is transmitted through the L1/L2 control channel at step S66, the reason indication information can be transmitted via incorporation into the DL scheduling information. The BS can transmit the reason indication information to the UE not only through the DPCCH but also channels such as Dedicated Physical Control Channel for HS-DSCH (HS-DPCCH), HS-DSCH-related Shared Control Channel (HS-SCCH), Absolute Grant Channel (AGCH), or Relative Grant Channel (RGCH).

Referring to FIG. 6, the UE transmits an error report message to the BS upon receiving the reason indication information indicating that the reason why the BS has transmitted a new packet (i.e., the second new transmission packet) is because the BS has received an ACK from the UE (S68). That is, through the error report message, the UE notifies the BS that, although the UE has transmitted a NACK for the first retransmission packet, the BS has received an ACK since an error has occurred during the transmission process. The MAC layer of the UE also reports the occurrence of an error during the data transmission process to the upper layer (i.e., the RLC layer) (S69). When reporting the error to the BS and the RLC layer, the UE provides the BS and the RLC layer with information as to the time at which the error occurred. The time information may include the time at which the UE received the first retransmission packet, the time at which the UE transmitted a NACK in response to the first retransmission packet, or a serial number of the MAC PDU corresponding to the first retransmission packet. The error report may include HARQ-process-related information. The error report message may be transmitted to the BS through a variety of methods. For example, the error report message may be transmitted through inclusion in a specific MAC message, RLC message, MAC PDU, or RLC PDU. The error report message may also be transmitted at the physical layer level. When the error report message is included in a MAC PDU, the error report message may be included in a header or a specific control element of the MAC PDU.

When the RLC layer of the UE receives an error report from the MAC layer, it performs a retransmission process of upper layer data (i.e., RLC PDUs) included in the MAC PDU with the RLC layer of the network (S70). That is, data retransmission is performed between the RLC layers of the network and the UE according to the ARQ scheme. Accordingly, the RLC layer of the UE transmits a status report message of the RLC PDUs to the RLC layer of the network and the RLC layer of the network performs data retransmission of the RLC PDUs. The UE transmits a NACK to the BS if the UE has failed to decode the received second retransmission packet (S71).

On the other hand, the UE does not need to transmit the error report message to the BS if the reason indication information received by the UE indicates that the reason why the BS has started transmitting a new packet is because the number of transmissions has reached the maximum allowed count or indicates that the reason is because there is a need to transmit data for the second service with higher priority than the first service to the receiving side while the transmitting side transmits data for the first service to the receiving side according to the HARQ technique. However, if the reason indication information received by the UE indicates that the reason why the BS has started transmitting a new packet is because the number of transmissions has reached the maximum allowed count, it is preferable that the MAC layer of the UE transmits the reason indication information to the RLC layer so that retransmission of associated RLC PDUs can be performed at the RLC layer level.

In another embodiment of the invention, when the BS stops transmitting data to the UE, the BS may transmit information (i.e., stop indication information) indicating the reason why it has stopped data transmission to the UE. For example, when the BS has no data for transmission to the UE, the BS can transmit stop indication information to the UE to inform the UE of the reason why it has stopped data transmission to the UE. A detailed method for transmitting the stop indication information may correspond to the above method for the BS transmitting the reason indication information to the UE.

The above embodiments are provided by combining components and features of the invention in specific forms. The components or features of the invention should be considered optional if not explicitly stated. The components or features may be implemented without being combined with other components or features. The embodiments of the invention may also be provided by combining some of the components and/or features. The order of the operations described above in the embodiments of the invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The above embodiments of the present invention have been described focusing on the data communication relationship between a UE (or terminal) and a BS. Specific operations which have been described as being performed by the BS may also be performed by upper nodes as needed. That is, it will be apparent to those skilled in the art that the BS or any other network node may perform various operations for communication with terminals in a network including a number of network nodes. The term "base station (BS)" may be replaced with another term such as "fixed station", "Node B", "eNode B (eNB)", or "access point". The term "terminal" may also be replaced with another term such as "user equipment (UE)", "mobile station (MS)", "mobile station (MS)", or "mobile subscriber station (MSS)".

The embodiments of the invention can be implemented by hardware, firmware, software, or any combination thereof. In the case where the invention is implemented by hardware, an embodiment of the invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the invention is implemented by firmware or software, the method for controlling data retransmission at a transmitting side in a wireless communication system according to an embodiment of the invention may be implemented in the form of modules, processes, functions, or the like which perform the features or operations described above. Software codes can be stored in a memory unit so that they can be executed by a processor. The memory unit may be located inside or outside the processor and can communicate data with the processor through a variety of known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

Industrial Applicability

The present invention can be applied to wireless communication systems such as mobile communication systems and wireless Internet systems.

The invention claimed is:

1. A method for controlling data retransmission at a transmitting side in a wireless communication system, the method comprising:
   transmitting a new transmission packet to a receiving side, the new transmission packet not being a retransmission packet to be transmitted to the receiving side in response to a negative acknowledgement signal (NACK) transmitted from the receiving side; and
   transmitting reason indication information, indicating a reason why the transmitting side has initiated the transmission of the new transmission packet, to the receiving side,
   wherein the reason indication information is included in the new transmission packet to be transmitted to the receiving side,
   wherein the reason why the transmitting side has initiated the transmission of the new transmission packet is because the number of times a specific packet has been previously transmitted to the receiving side has reached a preset maximum transmission count.

2. The method according to claim 1, wherein the reason why the transmitting side has initiated the transmission of the new transmission packet is because the transmitting side has received an acknowledgement signal (ACK) from the receiving side in response to a packet previously transmitted to the receiving side.

3. The method according to claim 1, wherein the reason why the transmitting side has initiated the transmission of the new transmission packet is because the new transmission packet is associated with a service with higher priority than a service associated with a packet previously transmitted to the receiving side.

4. A method for controlling data retransmission at a receiving side in a wireless communication system, the method comprising:
   receiving a new transmission from a transmitting side, the new transmission packet not being a retransmission packet to be transmitted by the transmitting side in response to a negative acknowledgement signal (NACK) transmitted to the transmitting side; and
   receiving reason indication information, indicating a reason why the transmitting side has initiated the transmission of the new transmission packet, from the transmitting side,
   wherein the reason indication information is received by being incorporated in the new transmission packet,
   wherein the reason indication information indicates that the reason why the transmitting side has initiated the transmission of the new transmission packet is because the number of times a specific packet has been previously transmitted to the receiving side has reached a preset maximum transmission count.

5. The method according to claim 4, wherein the reason indication information indicates that the reason why the transmitting side has initiated the transmission of the new transmission packet is because the transmitting side has received an acknowledgement signal (ACK) from the receiving side in response to a packet most recently transmitted to the receiving side.

6. The method according to claim 5, further comprising transmitting an error report message to the transmitting side when the receiving side has not transmitted an acknowledgement signal (ACK) to the transmitting side in response to the packet most recently received by the receiving side.

7. The method according to claim 6, wherein the error report message includes time information associated with the packet most recently received by the receiving side.

8. The method according to claim 7, wherein the time information is information of the time at which the receiving side has transmitted a negative acknowledgement signal (NACK) in response to the packet most recently received by the receiving side.

9. The method according to claim 4, wherein the reason indication information indicates that the reason why the transmitting side has initiated the transmission of the new transmission packet is because the new transmission packet is associated with a service with higher priority than a service associated with a packet previously transmitted from the transmitting side to the receiving side.

* * * * *